(12) United States Patent
Herrin

(10) Patent No.: US 6,843,214 B1
(45) Date of Patent: Jan. 18, 2005

(54) METHOD FOR BALANCING ENGINE CYLINDER BANK OUTPUT USING CRANKSHAFT SENSING AND INTAKE CAM PHASING

(75) Inventor: Ronald J. Herrin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/700,975

(22) Filed: Nov. 4, 2003

(51) Int. Cl.$^7$ .................................................. F01L 1/34
(52) U.S. Cl. ............................... 123/90.15; 123/90.16; 123/90.17
(58) Field of Search .......................... 123/90.15, 90.16, 123/90.17, 90.31

(56) References Cited

U.S. PATENT DOCUMENTS 5,983,876 A * 11/1999 Irons et al. ................. 123/676
6,021,758 A * 2/2000 Carey et al. ................ 123/436

OTHER PUBLICATIONS

Tuttle, Controlling Engine Load by means of Late Intake–Valve Closing, SAE Paper No. 800794, 1981.*
Tuttle, Controlling Engine Load by means of Early Intake–valve Closing, SAE Paper No. 820408, 1982.*

* cited by examiner

Primary Examiner—Thomas Denion
Assistant Examiner—Zelalem Eshete
(74) Attorney, Agent, or Firm—Karl F. Barr, Jr.

(57) ABSTRACT

A method is disclosed for balancing work output from cylinder banks of an engine having a common crankshaft and separate intake camshafts with cam phasers for each bank. The method includes sensing a crankshaft rotational characteristic, such as instantaneous rotational speed or acceleration, during the power strokes of pistons of predetermined comparable cylinders (or all cylinders) of each bank, computing average crankshaft rotational characteristics for the power strokes of the comparable cylinders of each bank, and adjusting the phasing of at least one of the intake camshafts to obtain equal averages of the sensed characteristics of the crankshaft during the power strokes of the respective banks.

8 Claims, 2 Drawing Sheets

METHOD FOR BALANCING ENGINE CYLINDER BANK OUTPUT USING CRANKSHAFT SENSING AND INTAKE CAM PHASING

TECHNICAL FIELD

This invention relates to a method for balancing the output of multiple cylinder banks of an engine.

BACKGROUND OF THE INVENTION

It is known in the art relating to engines to use intake camshaft phasing (cam phasing) to vary intake valve closing (IVC) from normal to early or late closing in order to vary the quantity of intake air admitted to or retained in the cylinders. In engines with multiple cylinder banks, such as V-type engines, cam phasing may be obtained through separate cam phasers operable to control the timing of the intake camshafts provided for each cylinder bank.

Balancing of the output of the cylinders of the separate banks may be accomplished by electronic sensing of the angular position of mechanical targets provided on each cam phaser or camshaft. However, this does not ensure bank-to-bank balance of airflow, since manufacturing and assembly tolerances may result in some differences between sensed cam positions and actual valve timings.

These differences may be relatively unimportant when intake valve closing (IVC) occurs near the bottom dead center piston position, because changes in cylinder charge volume per crank angle change are low. However, the charge volume variations at valve closing increase during early or late valve closing, due to increased piston speeds farther from bottom dead center which result in greater variations in cylinder air charge and resulting cylinder power output. Thus, a more accurate method of balancing the output of multiple banks of engine cylinders is desired.

SUMMARY OF THE INVENTION

The present invention uses intracycle variations in crankshaft speed as an indicator of bank-to-bank variations in intake cam timing of multiple bank engines, such as V-type engines, which are provided with separate intake camshafts for each cylinder bank. A separate cam phaser must be provided for controlling each intake camshaft, but these are already known for controlling operation with early or late valve closing. The average crankshaft speed or acceleration during the power strokes of all the cylinders of each cylinder bank can be determined using current production crankshaft position sensors. Thus, the method of the invention may be performed using currently available hardware components.

The method includes the following base steps:
sensing a crankshaft rotational characteristic, such as instantaneous speed or acceleration, during the power strokes of pistons of predetermined comparable cylinders of each bank;
computing the average crankshaft rotational characteristics for the power strokes of the comparable cylinders of each bank; and
adjusting the phasing of at least one of the intake camshafts to obtain equal averages of the sensed characteristics of the crankshaft during the power strokes of the respective banks.

Since the comparative averages of instantaneous crankshaft speeds, or accelerations, of the crankshaft during the power strokes of the pistons of each bank are indicative of differences in the cylinder bank output, adjusting the cam phasing to equalize these differences will improve bank-to-bank balance in air rate, fuel rate, air-fuel ratio, and work output, thereby improving the equalization of power output of the multiple cylinder banks.

These and other features and advantages of the invention will be more fully understood from the following description of certain specific embodiments of the invention taken together with the accompanying drawings.

DESCRIPTION OF THE PREFERRED EMBODIMENT

Figure 1:
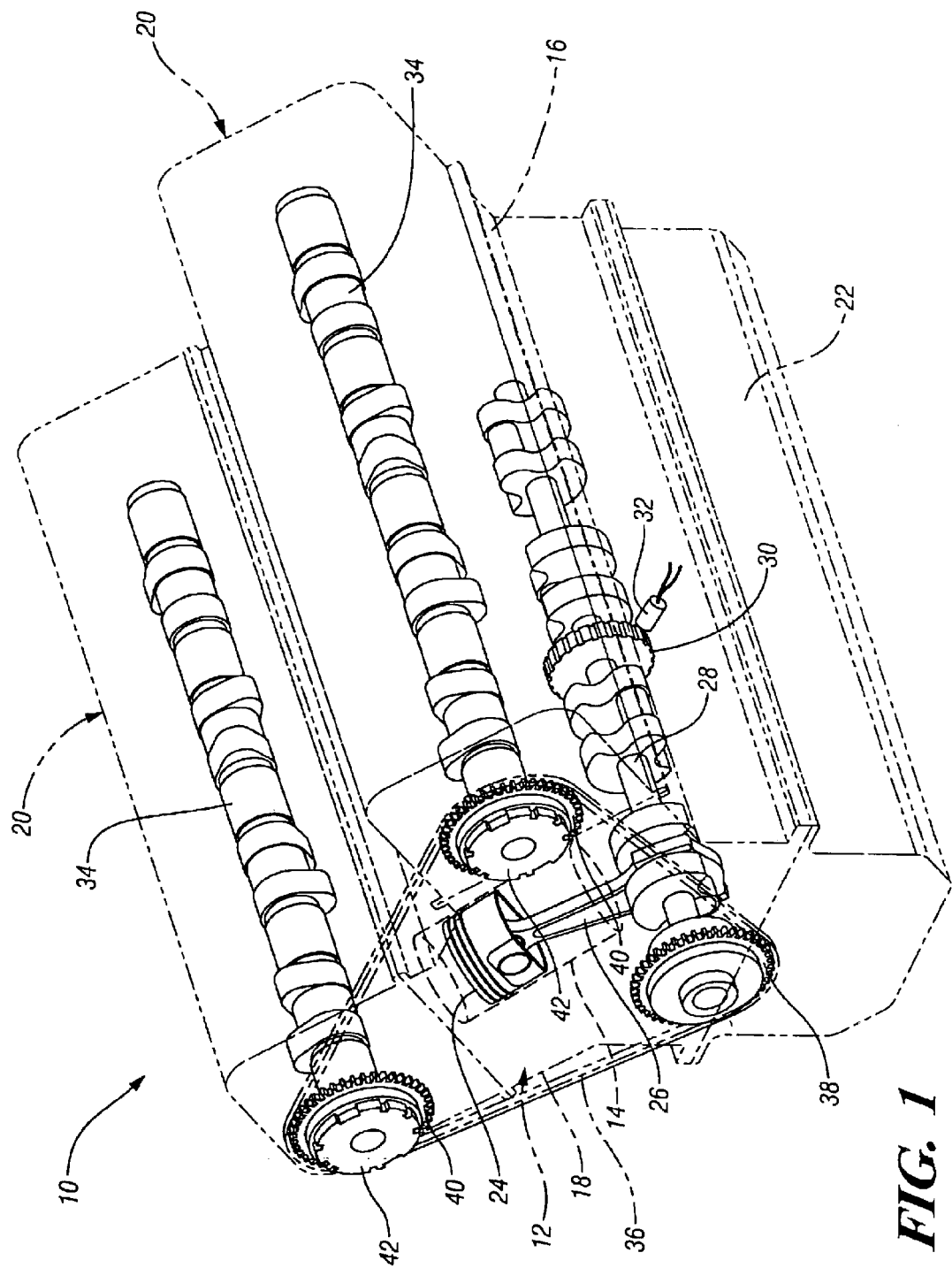
FIG. 1 is a pictorial view of a V-type overhead camshaft engine including components adapted for practicing the method of the present invention.

Referring first to FIG. 1 of the drawings in detail, numeral 10 generally indicates an internal combustion V8 engine having a cylinder block 12 containing eight cylinders 14 arranged in two cylinder banks 16, 18 each containing four longitudinally aligned cylinders, only one of which is shown. Cylinder heads 20 close the upper ends of the cylinders and an oil pan 22 closes the lower portion of the cylinder block and crankcase.

Within the cylinder block 12, each cylinder 14 is provided with a piston 24 that reciprocates in the cylinder. Each piston is connected by a connecting rod 26 with one of the throws of a crankshaft 28 rotatable in bearings, not shown, in the crankcase portion of the cylinder block. The crankshaft 28 conventionally mounts a timing wheel 30, having teeth which pass near a conventional crankshaft position sensor 32 mounted in the cylinder block.

The engine cylinder heads 20 each contain at least one longitudinally extended camshaft 34, which connects with suitable valve gear, not shown. The valve gear actuates the intake and exhaust valves, not shown, which admit intake air to the cylinders and control the discharge of exhaust gases from the cylinders. The camshafts 34 are driven through a timing chain 36 connected between a crankshaft mounted drive sprocket 38 and a pair of camshaft mounted driven sprockets 40. Each driven sprocket mounts a cam phaser 42, which is operable both to drive its camshaft and to alter its phase relation with the crankshaft in order to advance or retard the intake valve timing in order to operate in either an early intake valve closing (EIVC) mode or a late intake valve closing (LIVC) mode.

Figure 2:
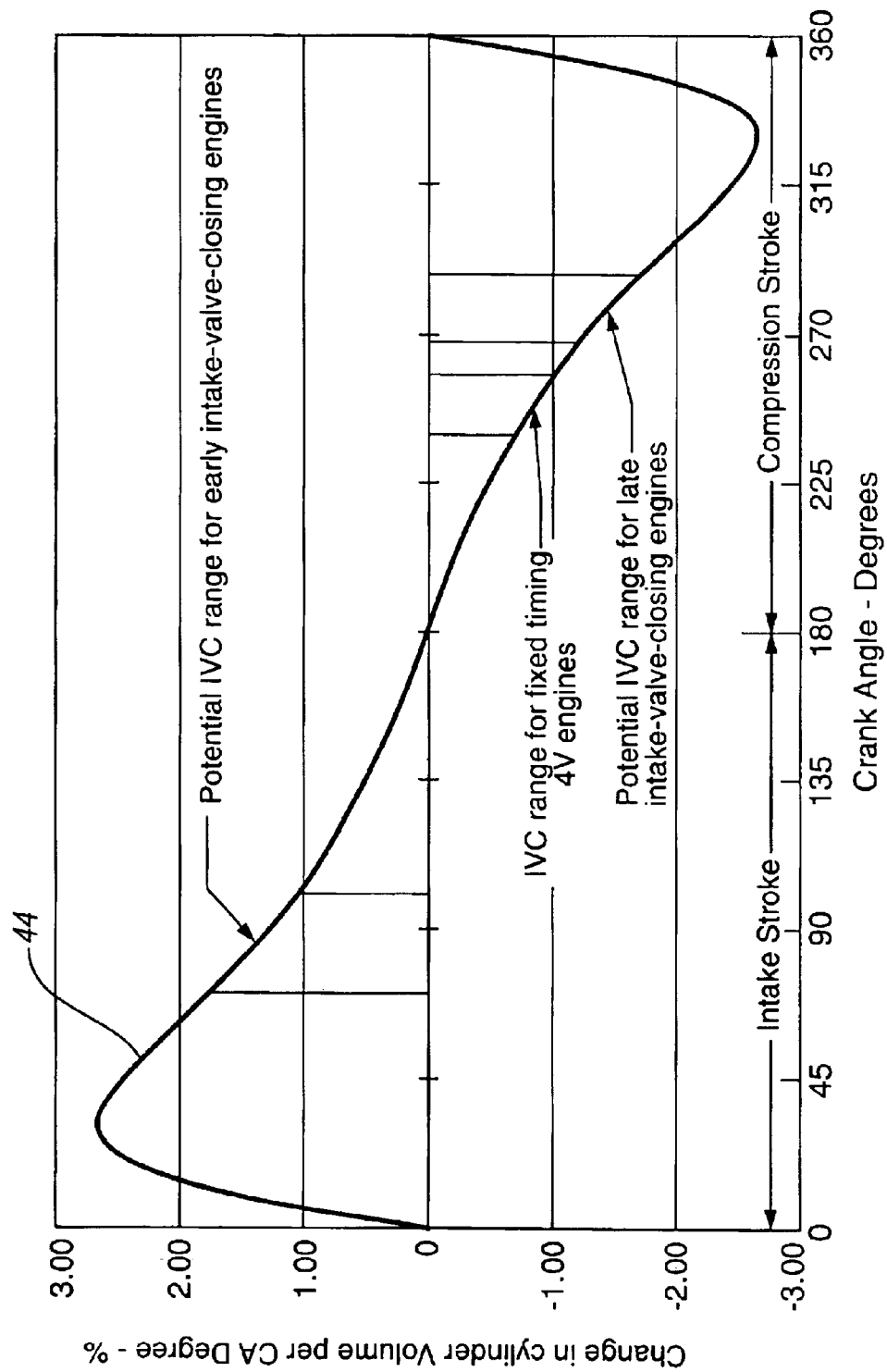
FIG. 2 is a graph illustrating the comparative change of cylinder volume verses engine crank angle over a complete crankshaft revolution.

Referring now to FIG. 2 of the drawings, line 44 of the diagram indicates variations in V/CA ratio, representing the percent change in cylinder volume (V) per degree of crank angle (CA) rotation over a complete 360 degree rotation of the engine crankshaft. As indicated, for the particular engine configuration of the exemplary diagram, V/CA ratio rises quickly from zero at the top dead center (0 degree) position of the crankshaft to about 2.6 V/CA at about 35 degrees crank rotation. The V/CA ratio then reduces gradually through a range of from about 1.8 to 1 percent in the range for early intake valve closing and continues through zero at 180 degrees crank angle, ending the intake stroke. The line 44, representing V/CA, continues gradually downward, passing the range for fixed timing IVC from about −0.6 to −1.2 and overlapping the range for late IVC extending from about −1.0 to about −1.7. Thereafter, line 44 continues downward to a peak at −2.6 and then rises rapidly to zero at the piston top dead center position of 360 degrees.

While the foregoing discussion utilizes an overhead cam V8 engine as an example, it should be understood that the present invention is equally applicable to all engine types having more than one cylinder bank having any number of cylinders and a separate camshaft for each bank that actuates at least the intake valves.

The graph of FIG. 2 illustrates that unintended variations of intake valve timing between the cylinders of the engine cylinder banks, such as might occur from variations in the camshaft and valve gear relationships in the two banks, creates substantially greater changes in cylinder volume between the banks when the engine is operated in the EIVC or LIVC ranges than when operated in a conventional fixed timing range. The result is that conventional means of controlling camshaft position with cam phasers may still result in a power unbalance between the engine cylinder banks of up to as much as seven or eight percent in cases of operation in the late or early closing modes.

To avoid this, the present invention provides a method for balancing the work output from cylinder banks of an engine having a common crankshaft and separate intake camshafts, each provided with a cam phaser. This method includes the steps of: Sensing a rotational characteristic of the crankshaft, such as speed or acceleration, to determine the instantaneous crankshaft speed or acceleration during the power strokes of the pistons, preferably of all the cylinders of each bank. These crankshaft speeds are higher then the average crankshaft speed because the rotational speed of the crankshaft actually varies by increasing during each power stroke and then slowing down slightly between power strokes. Thus, the rotational instantaneous speed of the crankshaft during the power strokes is an indicator of the amount of power being delivered by each of the individual cylinders. The average accelerations can also act as a power indicator so the term "rotational characteristic" is used to indicate all characteristics of crankshaft rotation which may be usable for indicating power output.

To obtain a figure representing the average power output for each cylinder bank, the average speed during the power strokes of all of the pistons of each bank, or their average acceleration, is computed and compared to the average speed or acceleration of the cylinders of the other cylinder bank.

Finally, in order to balance the power output or load of the two cylinder banks, at least one of the camshafts is adjusted by its cam phaser to move the camshaft to a position where the average cylinder output of that bank equals the average cylinder output of the other bank. Actually this is accomplished by adjusting the camshaft so that the average speeds, or accelerations of the camshafts during their power strokes are equal, which thus indicates an essential equality in the intake air rate, the fuel rate, the air fuel ratio and the cylinder bank work output.

By this method, closer equalization of the valve timing and cylinder output of the cylinders in the two banks is obtained. This allows the possibility of a greater range of adjustment of the camshafts for late intake valve closing, for example, in order to obtain the desired operating and emission control effects without reaching a condition where one of the cylinder banks limits the desired operational mode by an unbalance with the power output of the other bank.

In accordance with the invention, the rotational characteristics of the crankshaft which are sensed may be crankshaft speed or crankshaft acceleration at a predetermined point during the power strokes of the respective pistons. The use of a position sensor that is commonly utilized in production for crankshaft timing is one acceptable method of determining crank position. However, other means which are available may also be utilized within the scope of the invention.

Additionally, while it is preferable to actually measure the crankshaft speed or acceleration for all the cylinders of the engine, it would be alternatively possible to select one or two cylinders of the cylinder bank for measurement and utilize the average of those cylinders, or the output of only a single cylinder in each bank, in order to provide a usable, although less accurate, reading indicative of the cylinder bank power output. Finally, the method of the invention can be utilized whether the engine is operated with early intake valve closing or late intake valve closing and, if desired, can also be utilized where conventional fixed timing or some other variation of timing arrangement is used. Thus, the invention is not limited to use with late or early intake valve closing although these modes of operation appear to be more greatly benefited by the use of the method of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method for balancing work output from cylinder banks of an engine having a common crankshaft and separate intake camshafts with cam phasers for each bank; the method comprising:

sensing a crankshaft rotational characteristic during the power strokes of pistons of predetermined comparable cylinders of each bank and computing average crankshaft rotational characteristics for the power strokes of the comparable cylinders of each bank; and adjusting the phasing of at least one of the intake camshafts to obtain equal averages of the sensed characteristics of the crankshaft during the power strokes of the respective banks.

2. A method as in claim 1 wherein the sensed rotational characteristic is crankshaft speed.

3. A method as in claim 1 wherein the sensed rotational characteristic is crankshaft acceleration.

4. A method as in claim 1 wherein the sensed characteristic is detected by using a crankshaft position sensor.

5. A method as in claim 1 wherein the predetermined comparable cylinders include all the cylinders of each cylinder bank.

6. A method as in claim 1 wherein the engine is operable with early intake valve closing.

7. A method as in claim 1 wherein the engine is operable with late intake valve closing.

8. A method as in claim 1 wherein the engine is a V-type engine.

* * * * *